United States Patent
Kwon

[19]

[11] Patent Number: 5,953,835
[45] Date of Patent: Sep. 21, 1999

[54] VENTILATED SHOE

[75] Inventor: Taek Man Kwon, Seoul, Rep. of Korea

[73] Assignee: Lepard Corporation, Kyungki-do, Rep. of Korea

[21] Appl. No.: 08/801,320

[22] Filed: Feb. 18, 1997

[51] Int. Cl.[6] .................................................. A43B 13/20
[52] U.S. Cl. ..................................... 36/29; 36/28; 36/153
[58] Field of Search ................................... 36/29, 28, 153

[56] References Cited

U.S. PATENT DOCUMENTS

| | | | |
|---|---|---|---|
| 1,979,972 | 11/1934 | Guild | 36/29 |
| 4,217,705 | 8/1980 | Donzls | 36/29 |
| 4,219,945 | 9/1980 | Rudy | 36/29 |
| 4,446,634 | 5/1984 | Johnson et al. | 36/28 |
| 4,744,157 | 5/1988 | Dubner | 36/153 |
| 4,763,426 | 8/1988 | Polus et al. | 36/29 |
| 5,074,765 | 12/1991 | Pekar | 36/29 |
| 5,199,191 | 4/1993 | Moumdjian | 36/29 |
| 5,295,313 | 3/1994 | Lee | 36/29 |
| 5,353,525 | 10/1994 | Grim | 36/29 |
| 5,384,977 | 1/1995 | Chee | 36/28 |
| 5,406,661 | 4/1995 | Pekar | 36/29 |
| 5,444,926 | 8/1995 | Allen et al. | 36/29 |
| 5,588,227 | 12/1996 | Goldston et al. | 36/29 |
| 5,655,315 | 8/1997 | Mershon | 36/29 |
| 5,664,341 | 9/1997 | Schmidt et al. | 36/28 |
| 5,675,914 | 10/1997 | Cintron | 36/29 |
| 5,842,291 | 12/1998 | Schmidt et al. | 36/28 |

FOREIGN PATENT DOCUMENTS

| | | | |
|---|---|---|---|
| 37 01 826 | 10/1987 | Germany | 36/29 |
| 2 073 006 | 10/1981 | United Kingdom | 36/28 |
| WO 87/03789 | 7/1987 | WIPO | 36/29 |
| WO 93/07774 | 4/1993 | WIPO | 36/29 |

*Primary Examiner*—Allan R. Kuhns
*Attorney, Agent, or Firm*—Lynn Fiorito Watts

[57] ABSTRACT

A ventilated shoe, injection molding device and method for producing the ventilated shoe are disclosed. In the ventilated shoe, a cushion midsole, which is made of a foam resin material and includes a ventilation means, is interposed between and integrated with the inner and outer soles of the shoe. The above ventilation means is composed of a hemispherical air pump and an L-shaped air hose. The above air pump is installed on the inner sole of the shoe, while the L-shaped air hose is set in the midsole and opens to the atmosphere at the side surface of the midsole. The above ventilation means continuously and effectively ventilates the interior of the shoe, so that the ventilation means forcibly expels the moisturized and contaminated air from the interior of the shoe into the atmosphere while continuously introducing fresh air into the shoe. The above ventilated shoe thus prevents propagation of harmful germs on a wearer's foot and emission of a bad smell.

2 Claims, 10 Drawing Sheets

VENTILATED SHOE

BACKGROUND OF THE INVENTION

1. Field of the Invention

The present invention relates, in general, to ventilated shoes and, more particularly, to a structural improvement in such shoes for more effectively ventilating the interior of the shoes by interposing a midsole, made of a foam resin and provided with a ventilation means, between the inner and outer soles of a shoe. The invention also relates to a device and process for producing such ventilated shoes.

2. Description of the Prior Art

As well known to those skilled in the art, the feet of most people wearing shoes are wet with perspiration and dissipate heat, so that the air inside the shoes dampens and thereby causes propagation of harmful germs on the feet and gives out a bad smell. The above problems caused by the perspiration and heat inside the shoes may be overcome by ventilating the interior of the shoes. In an effort to achieve the above object, shoes provided with ventilation means are proposed and commercialized. Known ventilation means for shoes is composed of a ventilation port, which is provided on the inside wall of the shoe body for causing the interior of the shoe to communicate with the atmosphere. The above ventilation means also has an air cap, which is installed on the outside wall of the shoe body.

The shoes with the above ventilation means may be produced by a cementing process or an injection molding process. In the cementing process, the body and outer sole of a shoe are separately produced prior to tightly bonding the outer sole to the bottom (inner sole) of the shoe body. In order to bond the outer sole to the inner sole during the above cementing process, an adhesive sealer is applied to both the lower surface of the inner sole and the top surface of the outer sole. Meanwhile, in the injection molding process, a midsole, which is made of a foam resin, is interposed between the inner and outer soles prior to integrating the inner, mid and outer soles into a single structure by compressing them.

The injection molding process, which is connected with this invention, may produce various types of shoes with the various uses and configurations. For ease of description, a safety shoe, which is used for protecting a foot from injury in various industrial fields, is an example of the shoes produced by the injection molding process connected with this invention. However, it should be understood that the injection molding process may produce other types of shoes, such as sports shoes and climbing shoes.

Figure 1:
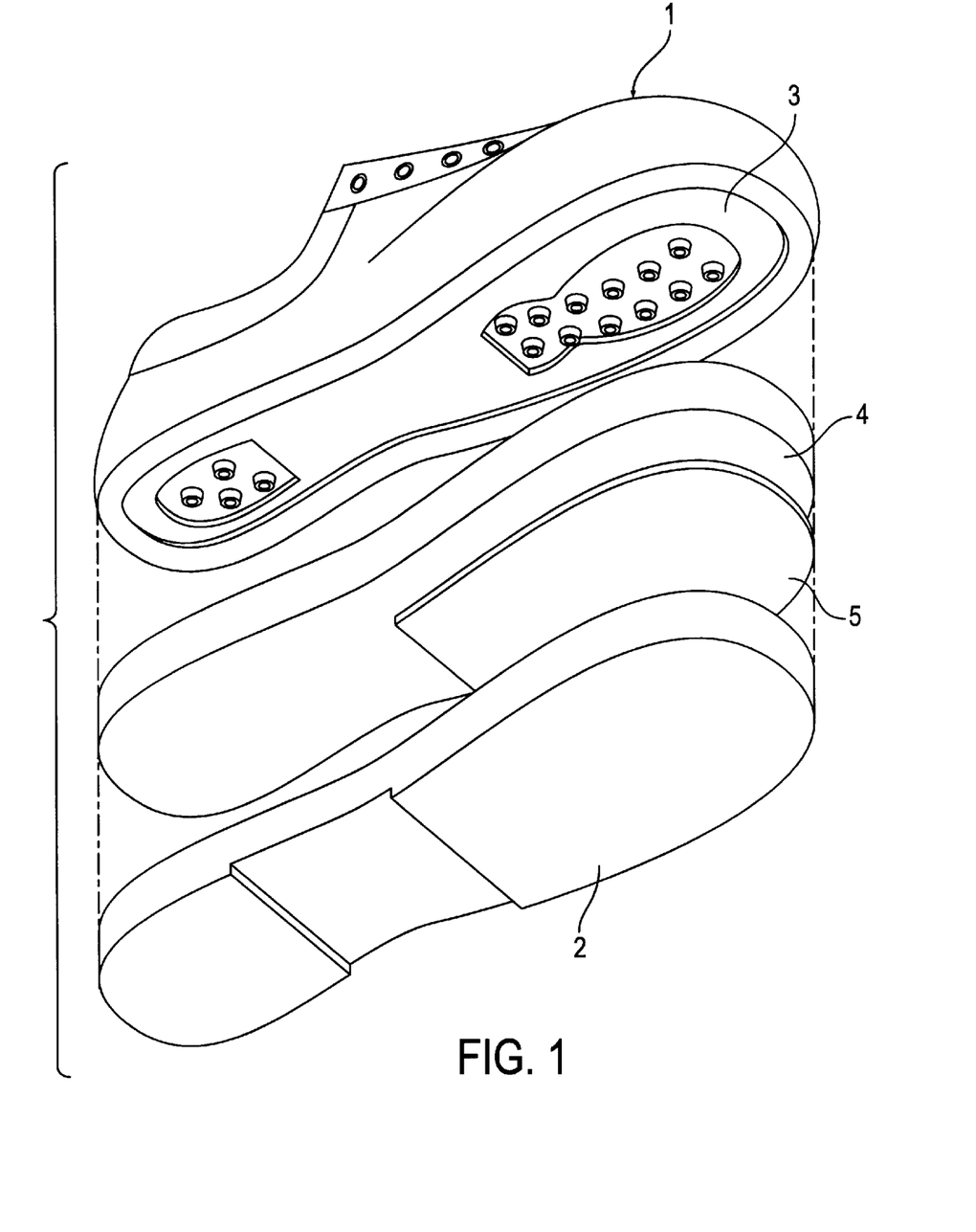
FIG. 1 is an exploded perspective view, showing the sole-structure of a typical safety shoe with a shock absorbing and reinforcing means.

FIG. 1 shows the sole-structure of a typical safety shoe with a shock absorbing and reinforcing means. As shown in FIG. 1, the typical safety shoe has a cushion midsole 4, which is interposed between the bottom (inner sole) 3 of a shoe body 1 and an outer sole 2 prior to integrating the inner, mid and outer soles into a single structure by compressing them. In addition, it is preferable to interpose a metal reinforcing plate 5 between the midsole 4 and the outer sole 2.

The above midsole 4, which is made of a cushion material and is interposed between the inner and outer soles 3 and 2 of the shoe, has the same configuration as the inner and outer soles. The cushion midsole 4 absorbs and intercepts the shock applied to a foot while stepping, thus protecting the foot from the shock.

The above safety shoes with the shock absorbing means effectively protect the feet of workers from dangerous objects by the metal reinforcing plate 5 and effectively absorbs shock, which is applied to the feet and knees of the workers, by the cushion midsole 4.

Figure 2:
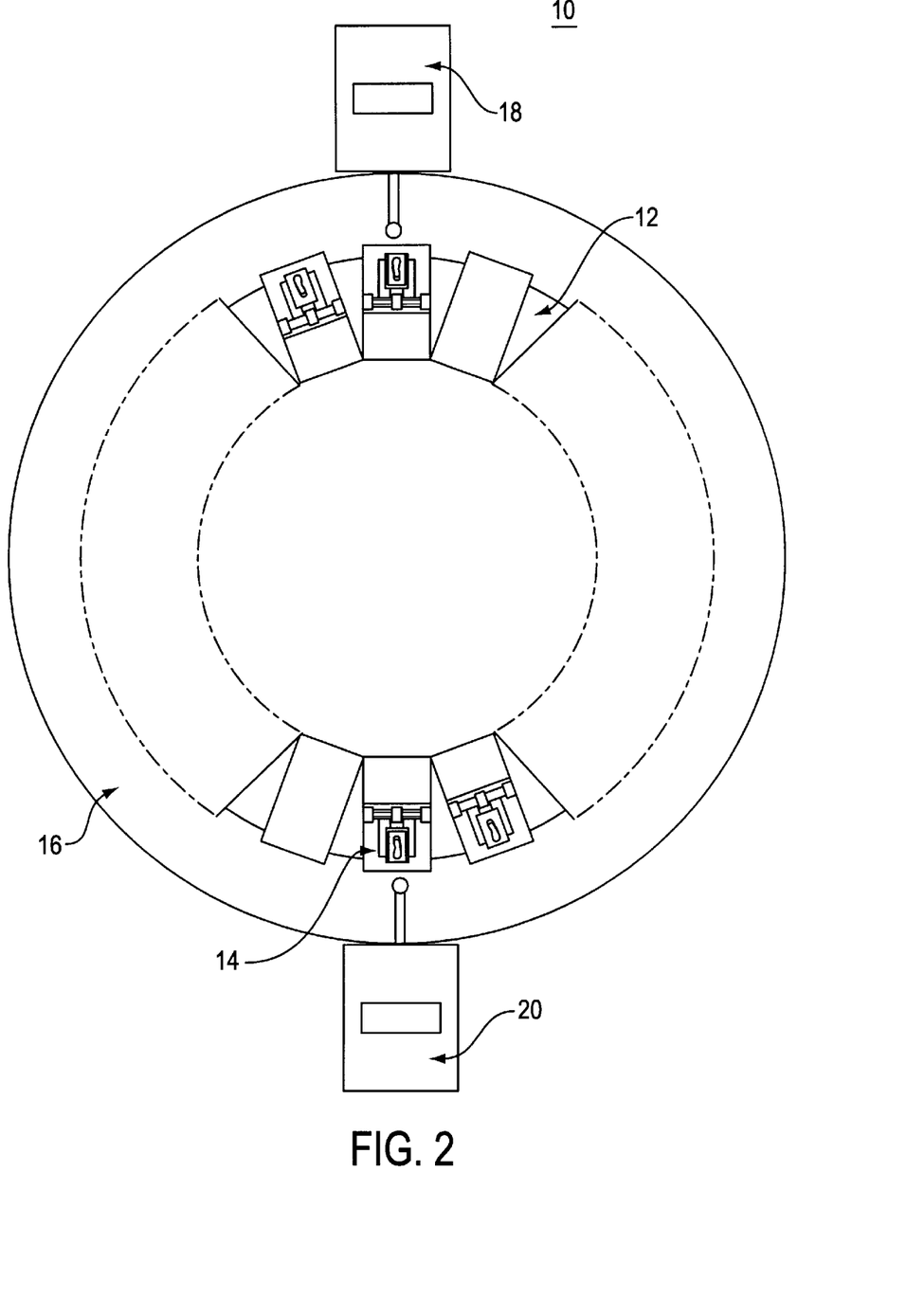
FIG. 2 is a plan view, showing the construction of a conventional rotary press injection molding machine used for producing shoes.

FIG. 2 shows the construction of a typical rotary press injection molding machine 10, which is used for producing the above safety shoes. The injection molding machine 10 includes a plurality of plastic injection molding units 14, which are regularly arranged in a circle on a rotary disc 12. The above rotary disc 12 is held on a circular die 16. Two solution feeders 18 and 20 are installed on the edge of the die 16 at diametrically-opposite positions.

Figure 3:
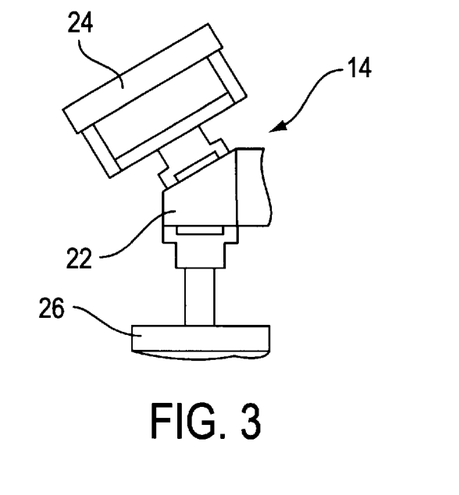
FIG. 3 is a side view showing the construction of the top mold section of a typical injection molding unit installed in the above rotary press injection molding machine.

The construction of the top mold section of each injection molding unit 14 is shown in FIG. 3. As shown in FIG. 3, the top mold section of each injection molding unit 14 includes a shoe holder 24 and a top mold 26. The above holder 24 and top mold 26 are held on the diametrically-opposite positions of a turret 22, so that the holder 24 and top mold 26 are rotated along with the turret 22. The unit 24 also includes a bottom mold 28. The above top mold section, including the turret 22, holder 24 and top mold 26, is movably held by a guide column, so that the top mold section vertically moves up and down relative to the bottom mold 28 under the guide of the guide column.

Figure 4:
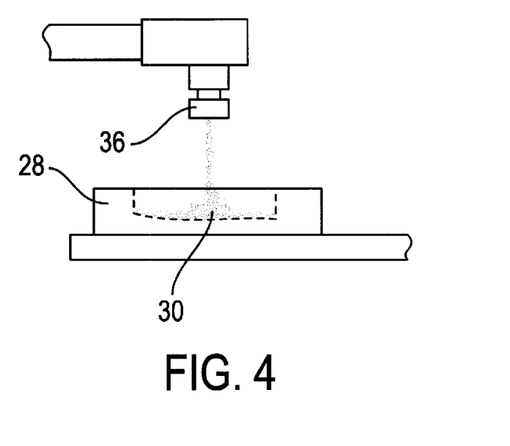
FIG. 4 is a side view, showing the first solution which is injected from a first solution feeder into the bottom mold of the typical injection molding unit.
Figure 5:
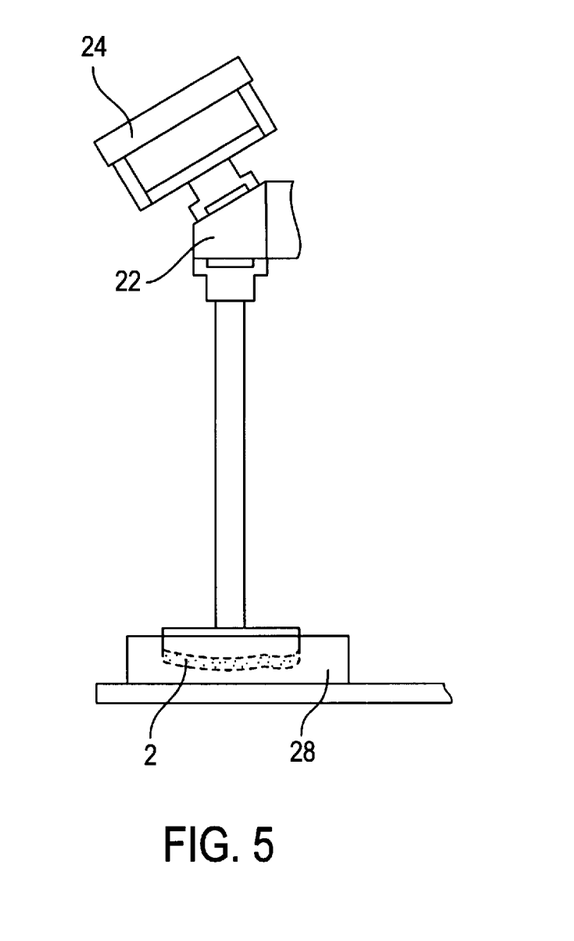
FIG. 5 is a side view of the top mold, which comes down onto the bottom mold of the typical injection molding unit in order to mold the first solution into the outer sole of a shoe.
Figure 6:
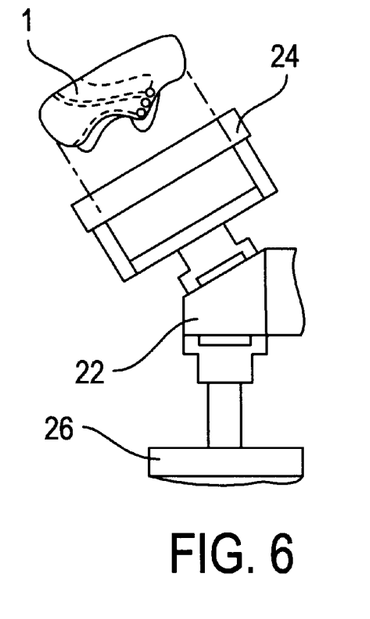
FIG. 6 is a side view showing a shoe body and the top mold section of the typical injection molding unit before the shoe body is seated onto the shoe holder of the top mold section.
Figure 7:
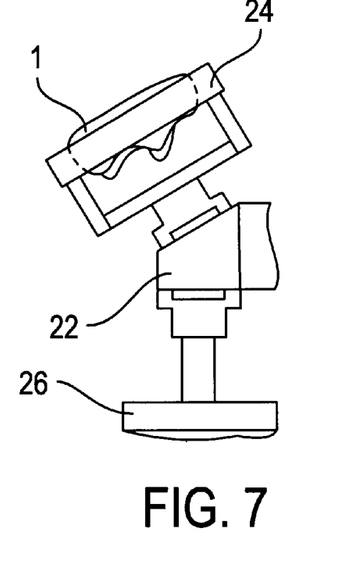
FIG. 7 is a side view showing the shoe body and the top mold section of the typical injection molding unit after the shoe body is held on the shoe holder of the top mold section.
Figure 8:
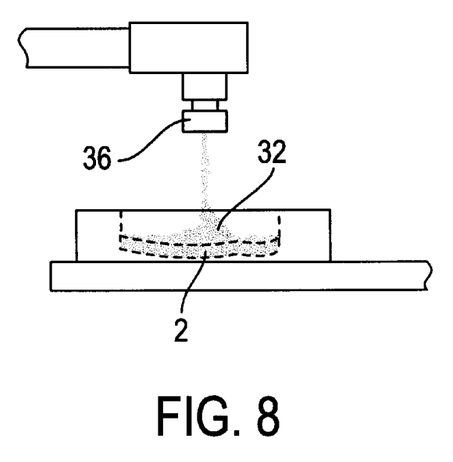
FIG. 8 is a side view showing the second solution injected from a second solution feeder onto the outer sole inside the bottom mold of the typical injection molding unit.

In an injection molding process for producing the safety shoes using the above injection molding machine 10, one injection molding unit 14 is positioned on the same line as the first solution feeder 18 as a result of the rotating motion of the rotary disc 12. In the above state, a foamless first solution 30 is injected from the head 36 of the first solution feeder 18 into the bottom mold 28 of the unit 14 as shown in FIG. 4. Due to the rotating motion of the rotary disc 12, the unit 14 with the first solution 30 moves to the diametrically-opposite position, thus being positioned on the same line as the second solution feeder 20. While the unit 14 moves from the first feeder 18 to the second feeder 20, the top mold section vertically moves down onto the bottom mold 28, so that the top mold 26 compresses the first solution 30 inside the bottom mold 28 as shown in FIG. 5. The first solution 30 inside the bottom mold 28 is thus formed into the outer sole 2. When the unit 14 with the formed outer sole 2 is positioned on the same line as the second solution feeder 20, a foam second solution 32 is injected from the second feeder 20 onto the molded outer sole 2 inside the bottom mold 28. The above second solution 32 is formed into the midsole 4 of the shoe.

As shown in FIGS. 6 to 9, while the injection molding unit 14 with the second solution 32 in its bottom mold 28 moves from the second feeder 20 by the rotating motion of the rotary disc 12, the separately-produced shoe body 1 is seated on the shoe holder 24. After seating the shoe body 1 onto the holder 24, the turret 22 of the top mold section is rotated at an angle of 180° C., so that the shoe holder 24 with the shoe body 1 is directed downward onto the bottom mold 28. The top mold 26 in the above state is directed upward.

The shoe body 1 held on the shoe holder 24 vertically comes down onto the bottom mold 28 thereby being brought into contact with the second solution 32 inside the bottom mold 28. In the above state, the second solution 32 inside the bottom mold 28 has not been completely hardened into the midsole 4, so that the bottom (inner sole) 3 of the shoe body 1 is bonded to the midsole 4 into a single structure. Of course, the midsole 4 in the above state is also bonded to the outer sole 2 into a single structure, so that the inner sole 3, mid sole 4 and outer sole 2 of the safety shoe are tightly bonded together into a single structure.

In the typical safety shoe produced by the above injection molding process, both the cushion midsole 4 and the metal reinforcing plate 5 are interposed between the inner and outer soles 3 and 2 and are integrated with the soles 3 and 2 into a single structure. The above safety shoe thus has a cushion sole structure due to the midsole 4, and a reinforced sole structure due to the metal plate 5. The above cushion sole structure of the safety shoe somewhat effectively absorbs and intercepts the shock, which is applied to the foot of a wearer from the ground while stepping. Meanwhile, the above reinforced sole structure protects the foot of the wearer from a sharpened material on the ground.

However, the above safety shoe, which exclusively has the cushion and reinforcing means for absorbing shock and protecting the wearer's foot from a sharpened material, has the following problems. That is, the above safety shoe is not provided with a means for ventilating the interior of the shoe. Therefore, the foot in the above shoe is wet with perspiration and dissipate heat, so that the air inside the safety shoe dampens and thereby causes propagation of harmful germs on the foot and gives out a bad smell.

SUMMARY OF THE INVENTION

It is, therefore, an object of the present invention to provide a structurally-improved ventilated shoe in which the above problems can be overcome, and the interior of which is more effectively ventilated by interposing a midsole, made of a foam resin and provided with a ventilation means, between the inner and outer soles of the shoe, thus preventing the dampening of the air inside the shoe, propagation of harmful germs on a foot and emission of a bad smell.

It is another object of the present invention to provide a device and process for producing the above ventilated shoe.

The present invention provides a ventilated shoe which comprises a shoe body, an outer sole, an inner sole formed by the bottom of the shoe body, and a cushion midsole interposed between and integrated with the inner and outer soles into a single structure. In the above ventilated shoe, the inner sole is provided with an opening. A ventilation means, which ventilates the interior of the shoe body, is provided in the sole structure of the above shoe. The ventilation means comprises an air pump and an air hose. A shielding plate is attached to the inner sole in order to shield the ventilation means.

The present invention also provides an injection molding device for producing the above ventilated shoe. The device comprises a plurality of injection molding units, which are regularly arranged in a circle on a rotary disc held on a circular die. First and second solution feeders are provided on diametrically-opposite positions of the edge of the circular die. Each of the molding units comprises a top mold, which is mounted to the turret of the top mold section and is provided with an L-shaped protrusion. The above L-shaped protrusion forms an L-shaped channel on the top of the outer sole. The L-shaped channel of the outer sole allows the air hose of the ventilation means to be set in the midsole when the inner sole and the midsole are compressed together and are integrated into a single structure. A shoe holder is mounted to the turret at a position diametrically opposite to the top mold. The shoe holder is provided with a hose holder for holding and closing the air hose while the inner sole is bonded to the midsole.

The present invention further provides an injection molding process for producing the above ventilated shoe. In the above process, the ventilation means, comprising an air pump and an air hose, is seated onto the bottom of the shoe body in a way such that the air pump partially protrudes into the interior of the shoe body. The shielding plate is attached to the bottom of the shoe body around the air pump in order to shield the air pump. The turret of the injection molding unit is rotated in order to position the shoe holder directly above the bottom mold of the injection molding unit. A foam second solution is fed into the bottom mold in order to form a midsole. The shoe holder with the shoe body is lowered onto the bottom mold thus bringing the bottom of the shoe body with the ventilation means into pressure-contact with the second solution before the second solution has not been completely hardened into the midsole. The bottom of the shoe body is thus integrated with the midsole into a single structure with the air hose set in the midsole.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 11A:
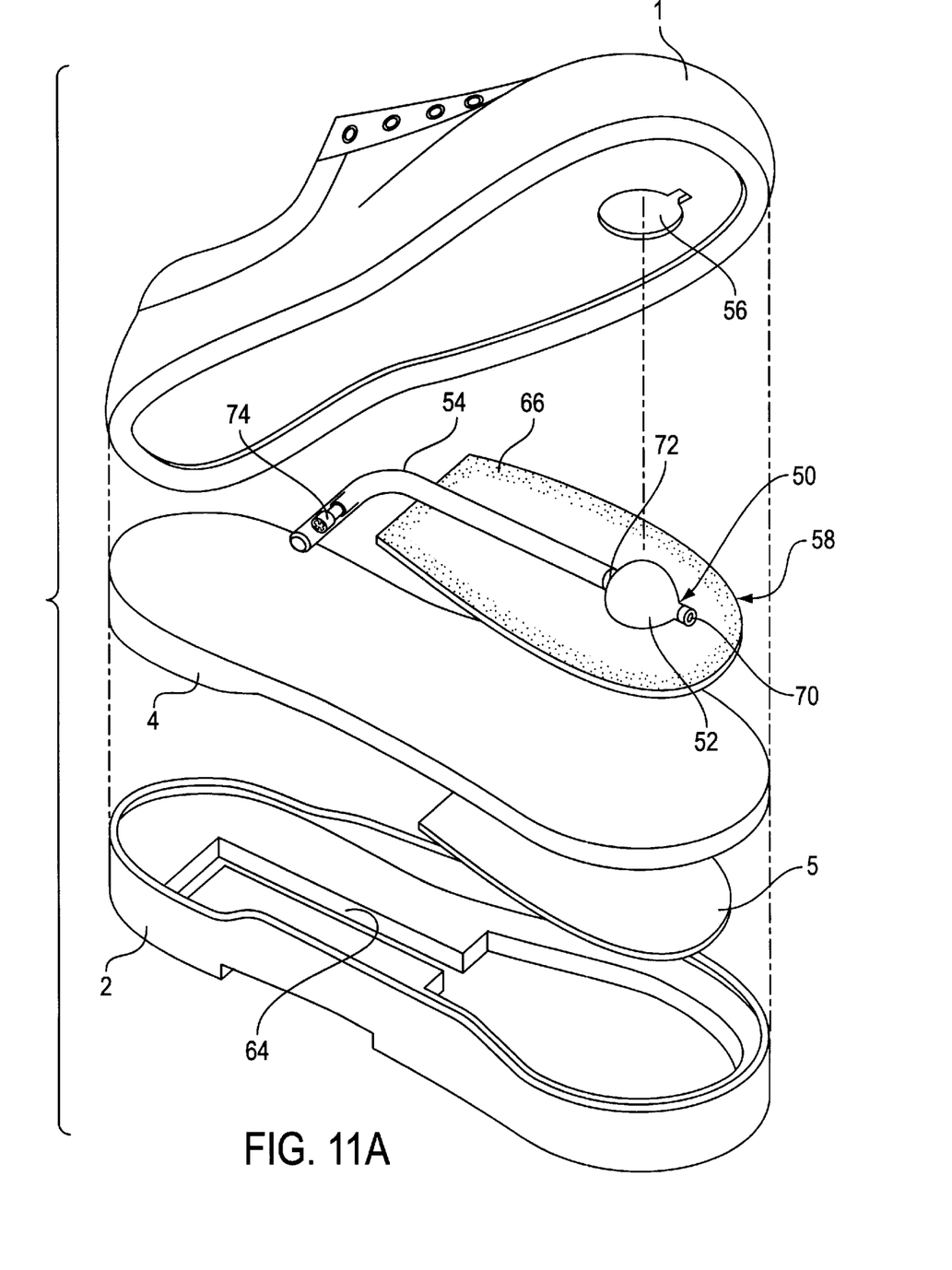
FIGS. 11a and 11b are exploded perspective views, respectively showing the sole structure of a safety shoe provided with the ventilation means in accordance with the preferred embodiment of the present invention and the construction of an air hose included in the ventilation means.
Figure 11B:
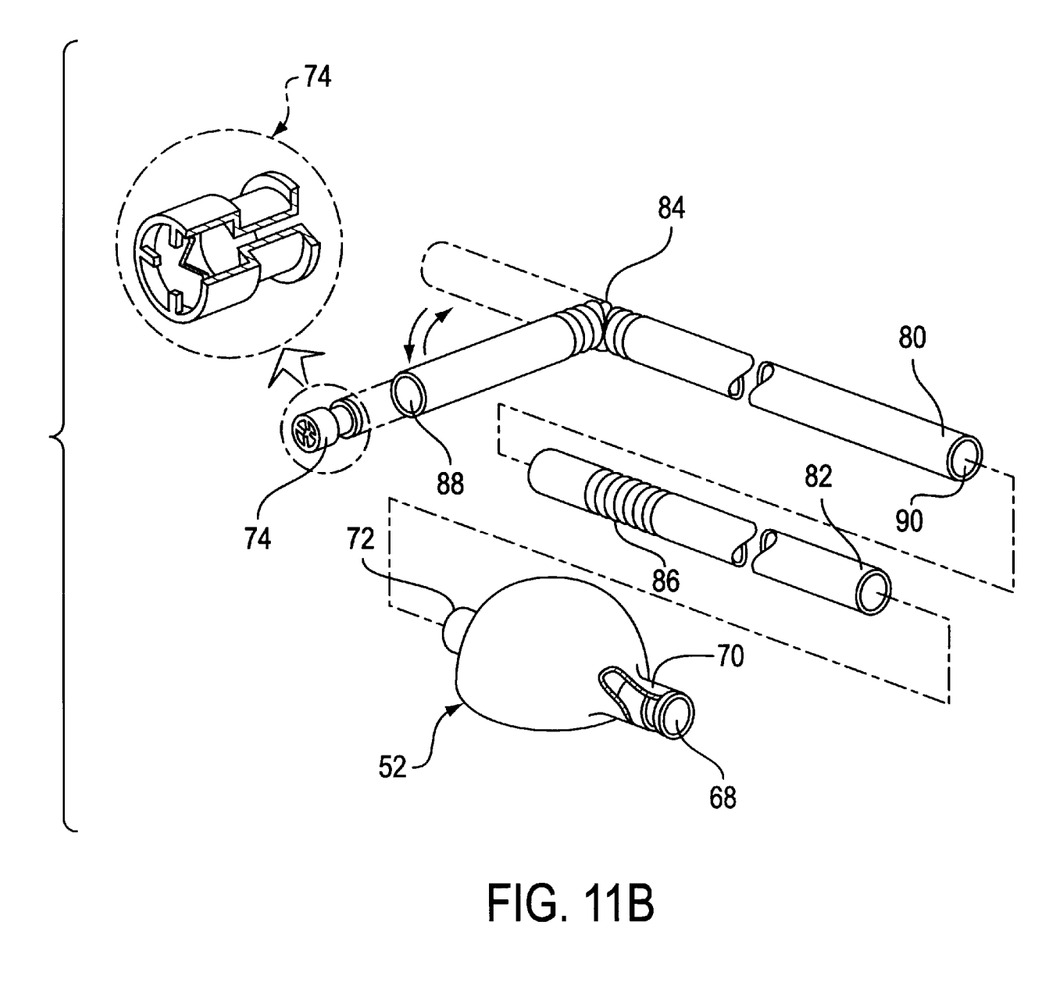

FIGS. 11a and 11b are exploded perspective views, respectively showing the sole structure of a safety shoe provided with the ventilation means in accordance with the preferred embodiment of the present invention and the construction of an air hose included in the ventilation means. As shown in FIGS. 11a and 11b, the safety shoe of this invention includes a midsole 4, which is interposed between the bottom (inner sole) 3 of the shoe body 1 and the outer sole 2. The front section of the above inner sole 3 is holed in order to form an opening 56. In accordance with this invention, a ventilation means 50 is set in the sole structure of the shoe, so that the interior of the shoe is effectively ventilated. The above ventilation means 50 comprises an air pump 52 and an air hose 54. The air pump 52 has a hemispherical configuration and is set in the opening 56 of the inner sole in a way such that the hemispherical top section of the pump 52 projects into the interior of the shoe body 1. Meanwhile, the air hose 54 extending from the air pump 52 is set in the midsole 4. A shielding plate 58 is attached to the lower surface of the inner sole 3 around the air pump 52, thus shielding the air pump 52. The top and bottom edges of the above shielding plate 58 have respective adhesive layers 66. Due to the above adhesive layers 66, the shielding plate 58, which is interposed between the inner sole 3 and the midsole 4, is easily integrated with the soles 3 and 4 when the soles 3 and 4 with the plate 58 are compressed together.

Figure 13:
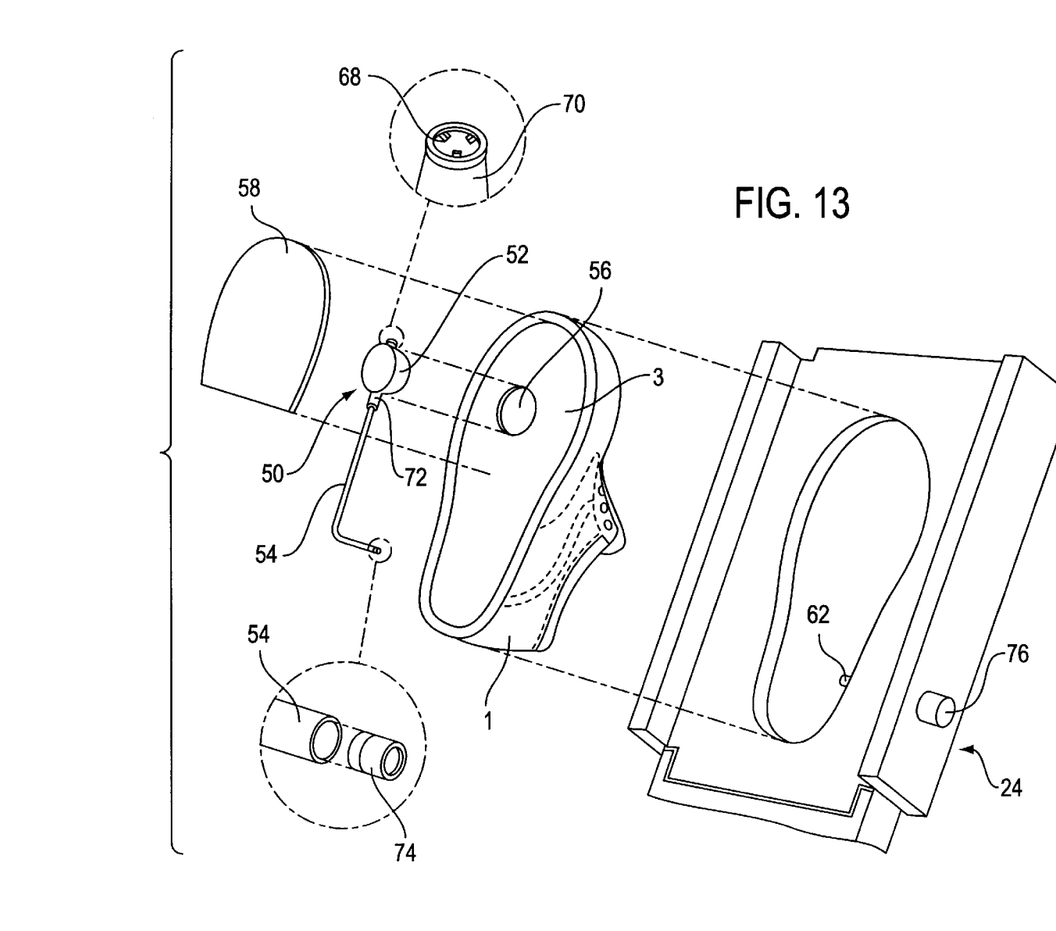
FIG. 13 is an exploded perspective view showing the shoe body and ventilation means before the shoe body is held on the shoe holder of the injection molding unit of the present invention.

The above hemispherical air pump 52, which is made of elastic rubber, is provided with suction and exhaust ports 70 and 72 and is installed in the opening 56 of the inner sole 3. The suction port 70 of the air pump 52 is provided with a suction choke valve 68 as shown in FIG. 13.

Meanwhile, the air hose 54, which has an L-shaped configuration, extends from the exhaust port 72 of the air pump 52 and passes in the midsole 4 prior to opening to the outside of the shoe at the side surface of the midsole 4. The other end of the above hose 54, which opens to the atmosphere, is provided with an exhaust choke valve 74 as shown in FIG. 13, so that the hose 54 prevents foreign impurities such as dust from introducing into the interior of the shoe body 1.

The above air hose 54 has a double pipe structure comprising two pipes: an outer pipe 80 and an inner pipe 82. One end of the outer pipe 80 has an outer bellows part 84, while one end of the inner pipe 82 has an inner bellows part 86.

The above safety shoe is produced by the rotary press injection molding machine 10, which is shown in FIG. 2. The above injection molding machine 10 includes a plurality of plastic injection molding units 14, which are regularly arranged in a circle on a rotary disc 12. The above rotary disc 12 is held on a circular die 16. Two solution feeders 18 and 20 are installed on the edge of the die 16 at diametrically-opposite positions. The top mold section of each injection molding unit 14 comprises a top mold 26 and a shoe holder 24, which are coupled to the diametrically-opposite positions of a turret 22. An L-shaped protrusion 60 is provided on the top mold 26, while a hose holder 62 is provided on the shoe holder 24. When the top mold 26 with the L-shaped protrusion 60 is pressed down onto the bottom mold 28 containing the first solution 30, the above protrusion 60 forms an L-shaped channel 64 on the top surface of the outer sole 2 formed of the first solution 30. The above L-shaped channel 64 allows the L-shaped air hose 54 to be set in the midsole 4 while the inner sole 3 is bonded to the midsole 4 as will be described later herein. The other end of the above air hose 54 is held and closed by the hose holder 62 of the shoe holder 24 in order to prevent the introducing of the second solution 32 into the hose 54 while the inner sole 3 with the ventilation means 50 is bonded to the midsole 4. After placing the ventilation means 50 onto the inner sole 3, the second solution 32 is fed from the second feeder 20 onto the outer sole 2 inside the bottom mold 28, thus forming the midsole 4. In the above state, the air pump 52 is set in the opening 56 of the inner sole 3, while the air hose 54 is set in the midsole 4.

In the process for producing the ventilated safety shoe of this invention, the ventilation means 50 is attached to the shoe body 1, which is seated on the shoe holder 24. Thereafter, the shielding plate 58 with the adhesive layer 66 is attached to the lower surf ace of the inner sole 3 around the air pump 52 of the ventilation means 50, thus shielding the air pump 52. The turret 22 of the top mold section is rotated at an angle of 180°, so that the shoe holder 24 with the shoe body 1 is positioned directly above the bottom mold 28. After the shoe holder 24 is positioned directly above the bottom mold 28, the foam second solution 32 is fed from the second feeder 20 onto the foamed outer sole 2 inside the bottom mold 28. The second solution 32 in the bottom mold 28 is hardened into the midsole 4. Before the second solution 32 is completely hardened, the shoe holder 24 with the shoe body 1 vertically comes down onto the bottom mold 28, so that the inner sole 3 is bonded to the midsole 4 into a single structure with the ventilation means 50 set in the midsole 4.

Figure 12:
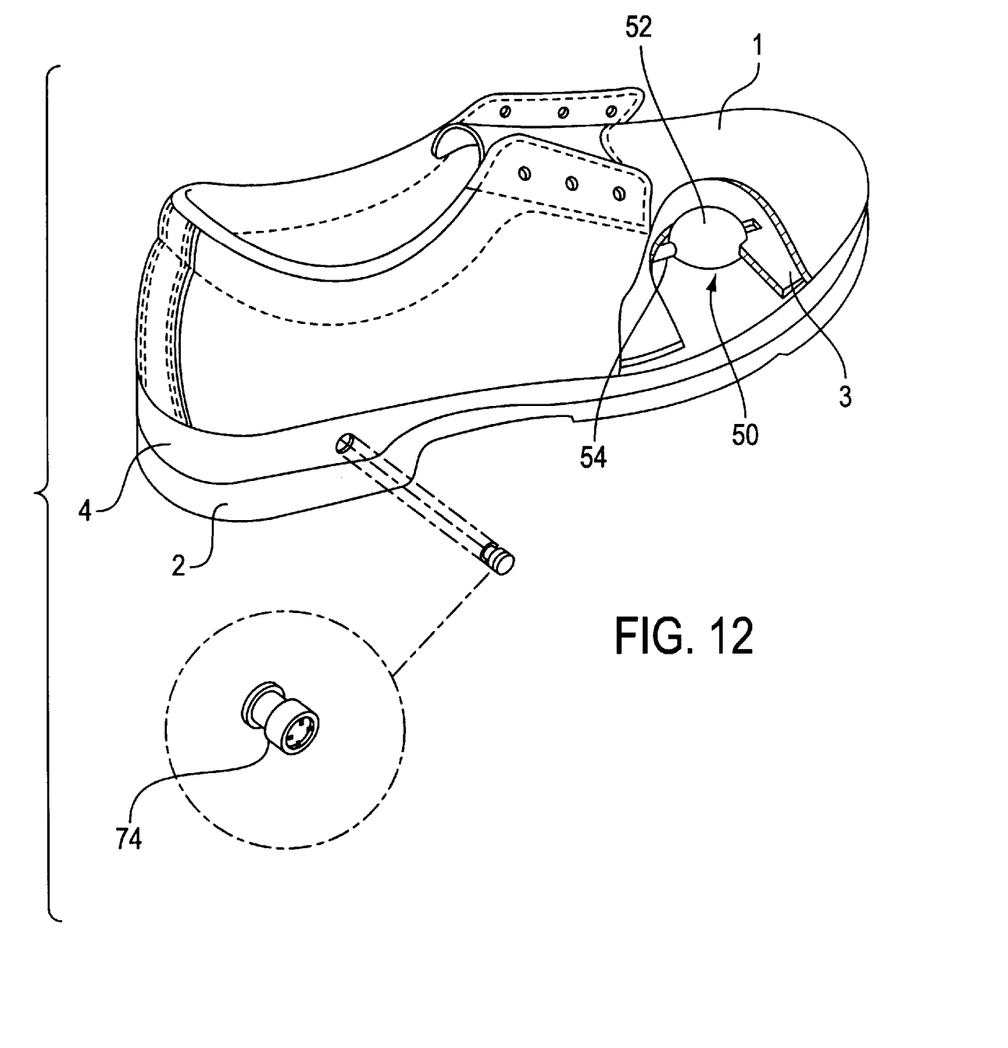
FIG. 12 is a partially broken perspective view showing the ventilation means installed in the safety shoe of the present invention.

As shown in FIGS. 11a, 11b and 12, the through opening 56 is formed on the front section of the bottom (inner sole) 3 of the shoe body 1 and receives the air pump 52 of the ventilation means 50 therein. As described above, the air pump 52 is provided with the suction choke valve 68 in the suction port 70, while the air hose 54 is provided with the exhaust choke valve 74. After setting the ventilation means 50 onto the inner sole 3, the shielding plate 58 is attached to the inner sole 3 around the air pump 52 thus shielding the air pump 52. The above ventilation means 50 is set in the sole structure, which is formed by the inner sole 3, midsole 4 and outer sole 2 integrated into a single structure.

The hemispherical air pump 52 has two ports, that is, the suction and exhaust ports 70 and 72. The suction choke valve 68 is installed in the suction port 70 of the air pump 52. The above air pump 52 is received in the opening 56 of the inner sole 3, so that the hemispherical upper section of the pump 52 projects into the shoe body 1.

The above L-shaped air hose 54 extends from the exhaust port 72 of the air pump 52 to the outside of the shoe. The other end of the above hose 54, which opens to the atmosphere, is provided with the exhaust choke valve 74, so that it is possible to prevent foreign impurities, such as dust and water, from being introduced into the interior of the shoe body 1 through the hose 54.

Due to the bellows parts 84 and 86 of the outer and inner pipes 80 and 82, the air hose 54 may be freely bent in the direction as shown by the arrow of FIGS. 11a and 11b.

The outer pipe 80 is made of a soft synthetic resin material, thus being somewhat flexible. Meanwhile, the inner pipe 82 is made of a hard material. The inner pipe 82, which has a length of shorter than the outer pipe 80, is inserted into the outer pipe 80, thus forming an outside space 88 and an inside space 90 on both ends of the double pipes. Thereafter, the exhaust choke valve 74 and the exhaust port 72 of the air pump 52 are set in the spaces 88 and 90, respectively.

The air pump 52 is made of elastic rubber, so that the pump 52 is provided with an elasticity. The hemispherical top section of the above pump 52 passes through the opening 56 of the inner sole 3 and projects into the interior of the shoe body 1. Therefore, when the air pump 52 is pressed by a foot, the pump 52 is compressed in order to suck air into the pump 52 through the suction choke valve 68, thus being pressurized. The pressurized air in turn flows into the air hose 54 and is exhausted into the atmosphere. Therefore, the interior of the shoe body 1 is ventilated.

When a person, who wears the above safety shoes provided with the ventilation means 50, takes a step, the wearer's foot presses down the air pump 52 projecting into the interior of the shoe body 1. The air pump 52 is thus compressed by the foot, so that the air inside the pump 52 is expelled into the atmosphere through the air hose 54. When the wearer lifts up one's foot in order to take another step, the pressing force of the foot is removed from the air pump 52, so that the elastic pump 52 restores its original configuration while forcibly sucking the fresh air into the interior of the shoe body 1 through the suction choke valve 68, which is installed in the suction port 70 of the pump 52.

When the air pump 52 is again compressed by the foot, the suction choke valve 68 is closed, while the existing air inside the shoe body 1 flows into the air hose 54 through the exhaust port 72 of the air pump 52.

The air, which flows into the air hose 52 from the air pump 52, is exhausted into the atmosphere through the exhaust choke valve 74, which is installed in the outlet end of the air hose 54 set in the midsole 4.

While the person wearing the above safety shoes walks on a field, the air pumps 52 of the safety shoes are repeatedly compressed and released, thus continuously ventilating the interior of the shoes. That is, the moisturized and contaminated air inside the shoe body 1 is expelled into the atmosphere through the exhaust choke valve 74 of the air hose 54, while the fresh air is introduced into the shoe body 1 through the suction choke valve 68 of the air pump 52.

In the above ventilation means 50, both the suction choke valve 68 of the air pump 52 and the exhaust choke valve 74 of the air hose 54 are throttle valves, which smoothly pass the air but check introduction of foreign impurities such as dust and water into the shoe body 1. The above ventilation means 50 smoothly ventilates the shoe body 1, thus overcoming the problems caused by the moisturized and contaminated air inside the shoe.

In the above description, the safety shoe, which is used for protecting a wearer's foot from injury in various industrial fields, is an example of the shoes produced by the injection molding process of this invention. However, it should be understood that the injection molding process of this invention may produce other types of ventilated shoes, such as sports shoes and climbing shoes.

Figure 14:
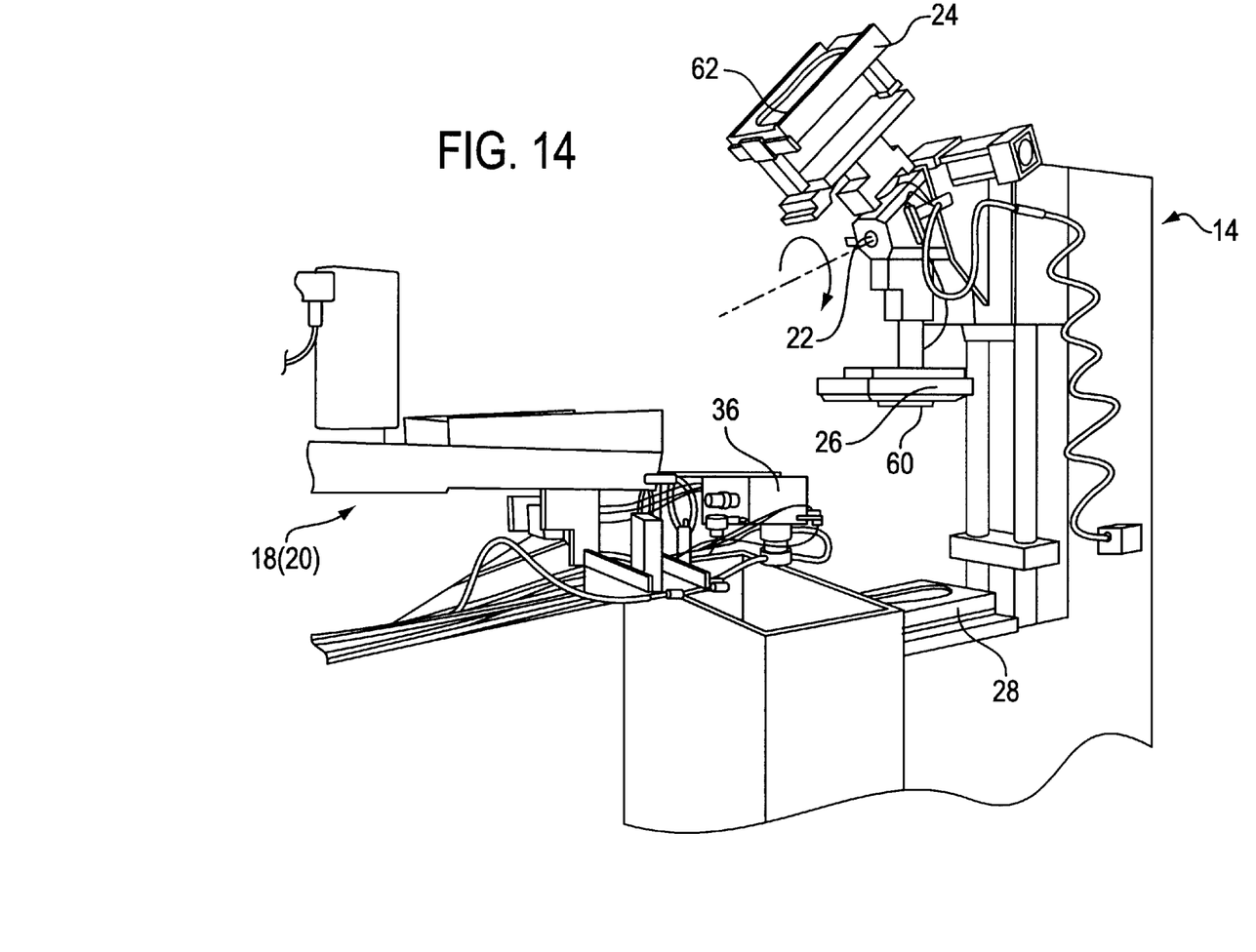
FIG. 14 is a perspective view showing the construction of the press injection molding machine used for producing the ventilated safety shoes according to the present invention.

FIG. 13 shows the shoe body 1 and the ventilation means 50 before the shoe body 1 is held on the shoe holder 24 of the injection molding machine 10 of this invention. FIG. 14 shows the construction of the press injection molding machine 10 of this invention.

As shown in FIG. 13, the shoe body 1 is seated in the opening of the shoe holder 24 prior to setting the air pump 52 with the air hose 54 in the opening 56 of the inner sole 3. In the above state, one end of the air hose 54 is coupled to the exhaust port 72 of the air pump 52. After the air pump 52 with the air hose 54 is set in the opening 56, the shielding plate 58 with the adhesive layer 66 is attached to the air pump 52, thus shielding the air pump 52.

The outlet end of the air hose 54 in the above state is coupled to the shoe holder 62, which projects into the opening of the shoe holder 24. Thereafter, the shoe holder 24 with the shoe body 1 vertically comes down onto the bottom mold 28. In the above state, the bottom mold 28 contains the foam second solution 32, which has not been completely hardened into the midsole 4, so that the inner sole 3 of the shoe body 1 is bonded to the midsole 4 with the ventilation means 50 set in the midsole 4. Due to the shielding plate 58 and the shoe holder 62, the second solution 32 is introduced into neither the suction port 70 of the air pump 52 nor the air hose 54 while the bottom 3 of the shoe body 1 is bonded to the midsole 4 of the second solution 32.

In the top mold section of each injection molding unit 14 of this invention, both the shoe holder 24 and the top mold 26 are coupled to the turret 22 in a way such that the holder 24 and top mold 26 are rotated by the rotating motion of the turret 22 as shown in FIG. 14. The above shoe holder 24 is provided with the hose holder 62, which holds and blocks the outlet end of the air hose 54 during the bonding of the shoe body 1 with the ventilation means 50 to the midsole 4 as described above. Meanwhile, the top mold 26 is provided with the L-shaped protrusion 60, which forms the L-shaped channel 64 on the top surface of the outer sole 2 formed of the first solution.

When an injection molding unit 14 is positioned on the same line as the first solution feeder 18 of the injection molding machine 10 in accordance with the rotating motion of the rotary disc 12, the top mold 26 of the above molding unit 14 is directed downward. However, when the above molding unit 14 is positioned in the same line as the second solution feeder 20 in accordance with the rotating motion of the rotary disc 12, the turret 22 of the above molding unit 14 is rotated at an angle of 180°, so that the top mold 26 is directed upward.

Figure 9:
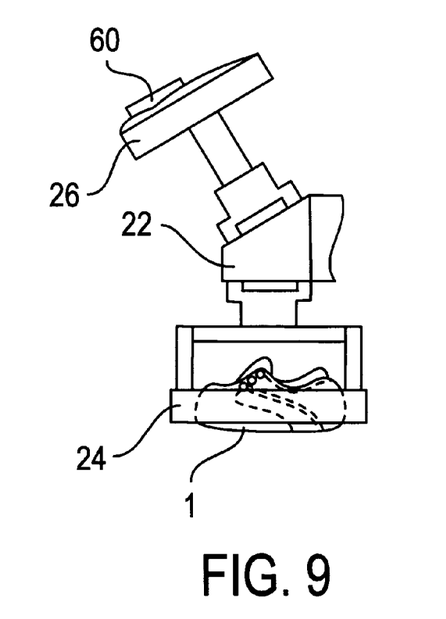
FIG. 9 is a side view showing the construction of a top mold section of an injection molding unit in accordance with the present invention.
Figure 10:
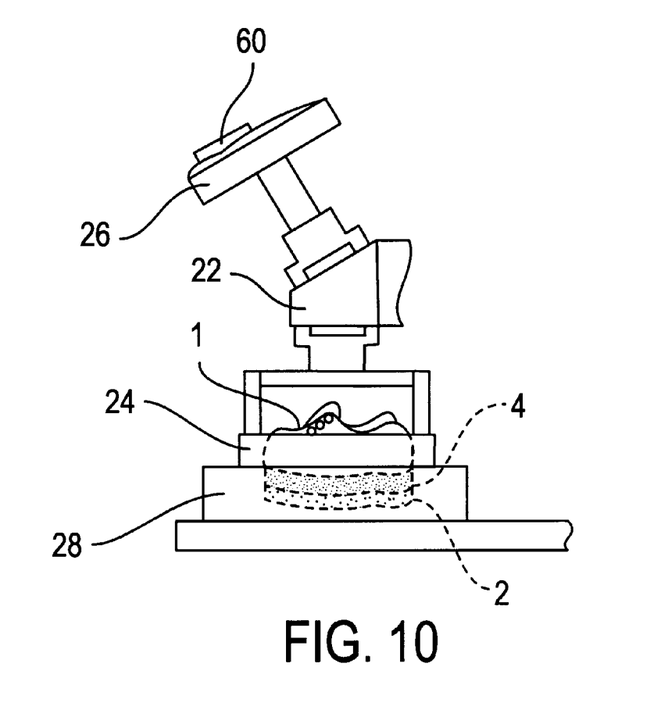
FIG. 10 is a side view showing the shoe holder of the top mold section of this invention, which comes down onto the bottom mold in order to bring the shoe body into contact with a second solution inside the bottom mold, thus bonding the inner sole to the midsole into a single structure.

In the top mold section of each injection molding unit 14, the shoe holder 24 and the top mold 26 extend from the turret 22 in diametrically-opposite directions when the top mold section is viewed in a front view. However, when the above top mold section is viewed in a side view as shown in FIGS. 9 and 10, the shoe holder 24 is slanted relative to the top mold 26 at an angle of inclination. Due to the above slant shoe holder 24, the separately-produced shoe body 1 on the die 16 is easily seated on the shoe holder 24.

When the injection molding unit 14 is positioned on the same line as the second solution feeder 20 in accordance with the rotating motion of the rotary disc 12, the head 36 of the above feeder 20 advances forward in order to be positioned directly above the bottom mold 28 of the unit 14. The head 36 in the above state feeds the foam second solution 32 onto the outer sole 2 inside the bottom mold 28. The above outer sole 2 inside the bottom mold 26 has been formed of the foamless first solution 30, which was fed from the first feeder 18 into the bottom mold 28. The above second solution 32 is formed into the midsole 4. While the second solution 32 is formed into the midsole 4, the injection molding unit 14 is continuously rotated by the rotating motion of the rotary disc 12.

During the rotating motion of the above injection molding unit 14, the turret 22 of the top mold section is rotated at an angle of 180°, so that the shoe holder 24 with the shoe body 1 is directed downward and in turn comes down onto the second solution 32 in the bottom mold 28 before the solution 32 is completely hardened into the midsole 4. The inner sole 3 of the shoe body 1 is bonded to the midsole 4 into a single structure.

The ventilation means 50, which comprises the hemispherical air pump 52 with the L-shaped air hose 54, is attached to the inner sole 3 of the shoe body 1. In the above case, the air pump 52 is received in the opening 56 of the inner sole 3 in a way such that the hemispherical top section of the pump 52 passes through the opening 56 and projects into the shoe body 1. The air hose 54, which extends from the exhaust port 72 of the air pump 52, is axially arranged on the inner sole 3. Thereafter, the shielding plate 58 with the adhesive layer 66 is attached to the inner sole 3 around the air pump 52 of the ventilation means 50, so that the plate 58 seals and prevents the air pump 52 from coming into direct contact with the midsole 4 when the inner sole 3 is bonded to the midsole 4.

On the other hand, the outlet end of the air hose 54 is coupled to the hose holder 62 of the shoe holder 24, thus being blocked by the hose holder 62. Therefore, it is possible to prevent the introducing of the second solution 32 into the air hose 54 when the inner sole 3 with the ventilation means 50 is brought into pressure-contact with the second solution 32 of the midsole 4.

During the injection molding process for producing the ventilated safety shoes according to this invention, the air hose 54 is set in a predetermined position of the midsole 4. That is, as the ventilation means 50, which is provided with the air hose 54 held by the hose holder 62, is regularly pressed down onto the second solution 32 of the midsole 4 inside the bottom mold 28, the air hose 54 is set in the predetermined position of the midsole 4. When the hose holder 62 is removed from the air hose 54 after integration of the soles 2, 3 and 4 and the ventilation means 50, the outlet end of the air hose 54 opens to the atmosphere at the side surface of the midsole 4.

The above hose holder 62 extends inward inside the opening of the shoe holder 24. The length of the above hose holder 62 inside the shoe holder's opening can be adjusted by a knob 76, which is provided outside the side wall of the shoe holder 24 as shown in FIG. 13. Therefore, the hose holder 62 may be fully retracted from the opening of the shoe holder 24 by handling the knob 76, when the shoe body 1 free from the ventilation means 50 is seated onto the shoe holder 24.

In the process for producing the ventilated safety shoes of this invention using the above injection molding machine 10, the rotary disc 12 carrying the regularly-spaced injection molding units 14 is rotated at a constant speed. When one injection molding unit 14 is positioned on the same line as the first feeder 18 according to the rotating motion of the rotary disc 12, the foamless first solution 30 is injected from the first feeder 18 into the empty bottom mold 28 of the unit 14. The above first solution 30 inside the bottom mold 28 is formed into the outer sole 2 by pressing down the top mold 26 onto the first solution 30 before the above unit 14 is positioned on the same line as the second solution feeder 20. In the above state, an L-shaped channel 64 is formed on the top surface of the outer sole 2 by the L-shaped protrusion 60 of the top mold 26.

After forming the above outer sole 2 of the first solution 30, the turret 22 of the top mold section is rotated at an angle of 180°, thus changing the positions of the shoe holder 24 and the top mold 26 with each other. The separately-produced shoe body 1 is seated on the shoe holder 24 in the above state prior to forming the opening 56 on the bottom (inner sole) 3 of the shoe body 1. Thereafter, the ventilation means 50, comprising the air pump 52 and the air hose 54, is set on the inner sole 3 prior to attaching the shielding plate 58 to the inner sole 3 at a position around the air pump 52. The air pump 52 is thus sealed by the shielding plate 58.

When the unit 14 is positioned on the same line as the second feeder 20, the head 36 of the second feeder 20 advances in order to be positioned directly above the bottom mold 28 of the unit 14. The head 36 of the second feeder 20 in the above state injects the foam second solution 32 onto the outer sole 2 inside the bottom mold 28. While the above second solution 32 is hardened into the midsole 4, the shoe holder 24 with the shoe body 1 comes down onto the bottom mold 28 so as to be brought into pressure-contact with the second solution 32. The inner sole 3 of the shoe body 1 is thus bonded to the midsole 4, which is integrated with the outer soles 2 into a single body.

While the inner sole 3 with the ventilation means 50 is bonded to the midsole 4 of the second solution 32, the second solution 32 is introduced into the suction port 70 of the air pump 52 due to the shielding plate 58, so that the ventilation means 50 set in the midsole 4 effectively ventilates the interior of the shoe body 1.

In addition, when the shoe holder 24 with the shoe body 1 is pressed down onto the bottom mold 28, the L-shaped air hose 54 of the ventilation means 50, which is held by the hose holder 62 of the shoe holder 24, is pressed down onto the midsole 4. Therefore, a part of the midsole 4 at a position corresponding to the air hose 54 is pushed into the L-shaped channel 64 of the outer sole 2. The air hose 54 is thus set in the hardened midsole 4.

As described above, the present invention provides structurally-improved ventilated shoes. The invention also provides an injection molding device and method for producing the above ventilated shoes. In the ventilated shoes of this invention, a cushion midsole, which is made of a foam resin material and includes a ventilation means, is interposed between and integrated with the inner and outer soles of a shoe. The above ventilation means comprises a hemispherical air pump and an L-shaped air hose. The above air pump is installed on the inner sole of the shoe in a way such that the pump partially protrudes into the shoe. Meanwhile, the L-shaped air hose, which extends from the above air pump, is set in the midsole and opens to the atmosphere at the side surface of the midsole. The above ventilation means continuously and effectively ventilates the interior of the shoe, so that the ventilation means forcibly expels the moisturized and contaminated air from the interior of the shoe into the atmosphere while introducing fresh air into the shoe. The ventilated shoe of this invention thus prevents propagation of harmful germs on a wearer's foot and emission of a bad smell. In accordance with the process of this invention, the inner and outer soles are easily integrated into a single structure by the midsole, thus simplifying the process for producing the shoes. In order to hold the air hose and to prevent the introducing of the foam resin of the midsole into the air hose while the inner sole with the ventilation means is bonded to the midsole into a single body, each shoe holder of the injection molding machine is provided with a hose holder. The above L-shaped air hose is set in the midsole due to the L-shaped channel formed on the outer sole. In order to form the above channel on the top of the outer sole, each top mold of the injection molding machine is provided with an L-shaped protrusion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ventilated shoe comprising:

a shoe body;

an outer sole;

an inner sole formed on the bottom of said shoe body, said inner sole having an opening;

a cushion midsole interposed between and integrated with said inner and outer soles into a single structure;.

ventilation means for ventilating the interior of said shoe body, said ventilation means comprising an air pump, positioned within said opening, and an air hose; and a shielding plate attached to said inner sole in order to shield said ventilation means;

wherein said air hose has an L-shaped configuration and is set in said midsole, said air hose further having a first end coupled to an exhaust port of said air pump and a second end open to the atmosphere at a side surface of said midsole, said second end being provided with an exhaust choke valve for preventing foreign impurities from being introduced into said shoe body through the air hose.

2. A ventilated shoe comprising:

a shoe body;

an outer sole;

an inner sole formed on the bottom of said shoe body, said inner sole having an opening;

a cushion midsole interposed between and integrated with said inner and outer soles into a single structure;

ventilation means for ventilating the interior of said shoe body, said ventilation means comprising an air pump, positioned within said opening, and an air hose; and a shielding plate attached to said inner sole in order to shield said ventilation means;

wherein said air hose comprises:

an outer pipe having an outer bellows part on end thereof; and an inner pipe having an inner bellows part on end thereof, said inner pipe being received in said outer pipe, thereby forming a double pipe structure.

* * * * *